(12) United States Patent
Vangipuram

(10) Patent No.: US 10,499,188 B2
(45) Date of Patent: Dec. 3, 2019

(54) SYSTEM AND METHOD FOR DETERMINING LOCATION OF RESOURCES IN A PREDEFINED REGION

(71) Applicant: Cognizant Technology Solutions India Pvt. Ltd., Chennai (IN)

(72) Inventor: Ranga Srinivasan Vangipuram, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 16/151,765

(22) Filed: Oct. 4, 2018

(65) Prior Publication Data

US 2019/0037344 A1   Jan. 31, 2019

Related U.S. Application Data

(62) Division of application No. 15/374,485, filed on Dec. 9, 2016.

(30) Foreign Application Priority Data

Oct. 10, 2016   (IN) .............................. 201641034653

(51) Int. Cl.
   *H04W 4/021*   (2018.01)
   *H04B 17/318*   (2015.01)
   *H04B 17/27*   (2015.01)

(52) U.S. Cl.
   CPC ............ *H04W 4/021* (2013.01); *H04B 17/27* (2015.01); *H04B 17/318* (2015.01)

(58) Field of Classification Search
   CPC .............................. H04B 17/318; H04W 4/021
   USPC .............................. 455/456.1-456.3; 370/338
   See application file for complete search history.

(56) References Cited

U.S. PATENT DOCUMENTS

| | | | | |
|---|---|---|---|---|
| 2011/0211563 | A1* | 9/2011 | Herrala | G01S 1/68 370/338 |
| 2013/0346593 | A1* | 12/2013 | Setlur | H04M 3/2227 709/224 |
| 2016/0353247 | A1* | 12/2016 | Sugaya | H04W 4/029 |

\* cited by examiner

*Primary Examiner* — Sam Bhattacharya
(74) *Attorney, Agent, or Firm* — Cantor Colburn LLP

(57) ABSTRACT

A system, computer-implemented method and computer program product for determining location of resources in a predefined region is provided, where the system includes a receiver, installed on one or more resources, to receive one or more signals, from one or more transmitters placed on predetermined locations in the predefined region and determine and forward a reference point ID corresponding to the one or more transmitters, the system further including a microcontroller, residing on the one or more resources, to receive the forwarded reference point ID, retrieve location coordinates corresponding to the determined reference point ID from a central server, fetch values of distance traveled by the one or more resources from an on-board diagnostic device installed on the one or more resources and detect direction in which the one or more resources are moving to determine location of the one or more resources in the predefined region in real-time.

9 Claims, 8 Drawing Sheets

| Record | Coordinates | RSSI Values |
|---|---|---|
| R55: | X:155, Y:206 | B1(-63dB) |
| R25: | X:155, Y:203 | B1(-69dB), B5(-72dB) |
| R35: | X:155, Y:204 | B1(-65dB), B5(-78dB) |
| R45: | X:155, Y:205 | B1(-60dB), B5(-85dB) |
| R33: | X:153, Y:204 | B1(-70dB), B5(-75dB), B4(-80dB) |
| R34: | X:154, Y:204 | B1(-72dB), B5(-80dB), B4(-85dB) |
| R43: | X:153, Y:205 | B1(-70dB), B4(-78dB), B5(-85dB) |
| R44: | X:154, Y:205 | B1(-75dB), B4(-83dB), B5(-90dB) |
| R65: | X:155, Y:207 | B1(-70dB), B2(-80dB) |
| R54: | X:154, Y:206 | B1(-72dB), B4(-78dB) |
| R53: | X:153, Y:206 | B1(-70dB), B4(-75dB), B2(-82dB) |
| R75: | X:155, Y:208 | B1(-75dB), B2(-84dB), B3(-90dB) |
| R64: | X:154, Y:207 | B1(-74dB), B2(-82dB), B4(-90dB) |
| R26: | X:156, Y:203 | B1(-70dB), B7(-75dB) |
| R36: | X:156, Y:204 | B1(-72dB), B7(-80dB), B6(-88dB) |
| R37: | X:157, Y:204 | B1(-76dB), B6(-82dB), B7(-90dB) |
| R46: | X:156, Y:205 | B1(-74dB), B6(-80dB) |
| R56: | X:156, Y:206 | B1(-78dB), B6(-85dB) |
| R66: | X:156, Y:207 | B1(-79dB), B3(-86dB), B6(-92dB) |
| R76: | X:156, Y:208 | B1(-82dB), B3(-88dB) |

FIG. 1C

SYSTEM AND METHOD FOR DETERMINING LOCATION OF RESOURCES IN A PREDEFINED REGION

CROSS REFERENCE TO RELATED APPLICATION

This application is a divisional of U.S. patent applicant Ser. No. 15/374,485 filed on Dec. 9, 2016 which claims the benefit of Indian Patent Application No. 201641034653 filed on Oct. 10, 2016, the contents of both of said applications are herein incorporated by reference in their entirety.

FIELD OF THE INVENTION

The present invention relates to a system and method for locating resources. In particular, the present invention relates to a system and method for determining location of one or more resources such as forklifts in a pre-defined region such as a warehouse.

BACKGROUND OF THE INVENTION

Forklifts are used in various industries for lifting and moving materials over short distances. Over the years, forklifts have become an indispensable piece of equipment, especially in manufacturing and warehousing operations. Usually, any warehouse uses numerous forklifts during operations. As a result, it is important for managers to be able to track these forklifts within the warehouse for optimum usage and increasing operational efficiency.

Conventionally, various systems and methods exist for locating forklifts in a warehouse. For example, systems and methods exist that use Global Positioning System (GPS) devices and cellular network to track forklifts. However, these existing systems and methods suffer from various disadvantages. For instance, the GPS and cellular network signals may not be available inside the warehouse or the signals may be available but are not strong enough to determine location of the one or more forklifts. The dependency of these existing systems and methods on the GPS and cellular network therefore makes them inconsistent and unreliable. Further, the existing systems and methods do not provide features that assist managers in streamlining operations.

In light of the abovementioned disadvantages, there is a need for a system and method for determining location of one or more resources such as forklifts in a pre-defined region such as a warehouse. Further, there is a need for a system and method that does not depend on GPS and cellular network for determining location of the one or more resources. Furthermore, there is a need for a reliable, efficient and cost effective system and method capable of determining location of resources in real-time. In addition, there is a need for a system and method capable of providing optimum routing, reducing congestion in the predefined region, monitoring the floor and environment of the pre-defined region and providing emergency services.

SUMMARY OF THE INVENTION

A system, computer-implemented method and computer program product for determining location of one or more resources in a predefined region is provided. The system comprises a receiver, installed on one or more resources, configured to receive one or more signals, from one or more transmitters placed on predetermined locations in a pre-defined region, when the one or more resources are in vicinity of the one or more transmitters and determine and forward a reference point ID corresponding to the one or more transmitters. The system further comprises a microcontroller, residing on the one or more resources, configured to receive the forwarded reference point ID. The microcontroller is further configured to retrieve location coordinates corresponding to the determined reference point ID from a central server. Furthermore, the microcontroller is configured to fetch values of distance traveled by the one or more resources from an on-board diagnostic device installed on the one or more resources after a pre-defined interval of time and detect direction in which the one or more resources are moving using a direction detection module to determine location of the one or more resources in the predefined region in real-time. Also, the microcontroller is configured to forward the determined location of the one or more resources to the central server.

In an embodiment of the present invention, the one or more resources comprise tracking devices, equipment, goods and wheeled carriages and further wherein the wheeled carriages comprise forklifts, cars, wheelchairs, trolleys and carts. In an embodiment of the present invention, the predefined region comprise a warehouse, a hospital, a factory, an enterprise, an organization, an educational institution, a parking lot, an airport, a railway station and a bus station.

In an embodiment of the present invention, the one or more received signals are light pulses and wavelength of the light pulses is within visible light spectrum. In an embodiment of the present invention, the reference point ID corresponding to the one or more transmitters is encoded within the light pulses.

The computer-implemented method for determining location of one or more resources in a predefined region, via program instructions stored in a memory and executed by a processor, comprises receiving, at a receiver installed on one or more resources, one or more signals from one or more transmitters placed on predetermined locations in a pre-defined region when the one or more resources are in vicinity of the one or more transmitters. The computer-implemented method further comprises determining a reference point ID corresponding to the one or more transmitters. Furthermore, the computer-implemented method comprises retrieving location coordinates corresponding to the determined reference point ID from a central server. In addition, the computer-implemented method comprises fetching values of distance traveled by the one or more resources after a pre-defined interval of time. Also, the computer-implemented method comprises detecting direction in which the one or more resources are moving to determine location of the one or more resources in the predefined region in real-time. The computer-implemented method further comprises forwarding the determined location of the one or more resources to the central server.

The computer program product for determining location of one or more resources in a predefined region comprising a non-transitory computer-readable medium having computer-readable program code stored thereon, the computer-readable program code comprising instructions that when executed by a processor, cause the processor to receive, at a receiver installed on one or more resources, one or more signals from one or more transmitters placed on predetermined locations in a predefined region, when the one or more resources are in vicinity of the one or more transmitters. The processor further determines a reference point ID corresponding to the one or more transmitters. Furthermore, the processor retrieves location coordinates corresponding to the determined reference point ID from a central server. In addition, the processor fetches values of distance traveled by the one or more resources after a pre-defined interval of time. Also, the processor detects direction in which the one or more resources are moving to determine location of the one or more resources in the predefined region in real-time. The processor further forwards the determined location of the one or more resources to the central server.

A system, computer-implemented method and computer program product for determining location of one or more resources in a predefined region is provided. The system comprises a beacon reader configured to receive signals, at a resource, from one or more beacons installed in a predefined region and sort the received signals to form a Current Mobile Signal Vector (CMSV). The system further comprises a microcontroller configured to process the CMSV using a pre-stored Recursive Descent by Signal Strength (RDSS) algorithm and a pre-stored RDSS tree to determine a set of grid points corresponding to the CMSV. The microcontroller is further configured to use a K-Nearest Neighbors (K-NN) algorithm to determine a grid point, from the set of determined grid points having lowest Euclidean distance from the CMSV and determine coordinates corresponding to the determined grid point, wherein the determined coordinate is the location of the resource.

In an embodiment of the present invention, the one or more resources comprise tracking devices, equipment, goods and wheeled carriages and further wherein the wheeled carriages comprise forklifts, cars, wheelchairs, trolleys and carts. In an embodiment of the present invention, the predefined region comprise a warehouse, a hospital, a factory, an enterprise or an organization, an educational institution, a parking lot, an airport, a railway station and a bus station.

In an embodiment of the present invention, the pre-stored RDSS tree comprise a leaf node corresponding to the CMSV and the determined set of grid points corresponding to the CMSV are points on floor of the predefined region whose coordinates with respect to the predefined region are stored in the leaf node.

The computer-implemented method for determining location of one or more resources in a predefined region, via program instructions stored in a memory and executed by a processor, comprises receiving one or more signals, at a resource, from one or more beacons installed in a predefined region. The computer-implemented method further comprises sorting the received one or more signals to form a Current Mobile Signal Vector (CMSV). Furthermore, the computer-implemented method comprises processing the CMSV using a pre-stored Recursive Descent by Signal Strength (RDSS) algorithm and a pre-stored RDSS tree to determine a set of grid points corresponding to the CMSV. In addition, the computer-implemented method comprises using a K-Nearest Neighbors (K-NN) algorithm to determine a grid point, from the set of determined grid points having lowest Euclidean distance from the CMSV. The computer implemented method also comprises determining coordinates corresponding to the determined grid point, wherein the determined coordinate is the location of the resource.

The computer program product for determining location of one or more resources in a predefined region comprising a non-transitory computer-readable medium having computer-readable program code stored thereon, the computer-readable program code comprising instructions that when executed by a processor, cause the processor to receive one or more signals, at a resource, from one or more beacons installed in a predefined region. The processor further sorts the received one or more signals to form a Current Mobile Signal Vector (CMSV). Furthermore, the processor processes the CMSV using a pre-stored Recursive Descent by Signal Strength (RDSS) algorithm and a pre-stored RDSS tree to determine a set of grid points corresponding to the CMSV. Also, the processor uses a K-Nearest Neighbors (K-NN) algorithm to determine a grid point, from the set of determined grid points having lowest Euclidean distance from the CMSV. In addition, the processor determines coordinates corresponding to the determined grid point, wherein the determined coordinate is the location of the resource.

BRIEF DESCRIPTION OF THE ACCOMPANYING DRAWINGS

The present invention is described by way of embodiments illustrated in the accompanying drawings wherein:

FIG. 1C is a table illustrating Received Signal Strength Indicator (RSSI) values at select grid points in vicinity of a beacon B1, in accordance with an exemplary embodiment of the present invention;

DETAILED DESCRIPTION OF THE INVENTION

A system and method for determining location of one or more resources in a predefined region is described herein. The invention provides for a system and method that does not depend on Global Positioning System (GPS) and cellular network for determining location of the one or more resources. Further, the invention provides for a reliable, efficient and cost effective system and method capable of determining location of resources in real-time. Furthermore, the invention provides for a system and method capable of providing optimum routing, reducing congestion in the predefined region, monitoring the floor and environment of the predefined region and providing emergency services.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. The terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For the purposes of clarity, details relating to technical material that is known in the technical fields related to the invention have not been described in detail so as not to unnecessarily obscure the present invention.

Figure 1:
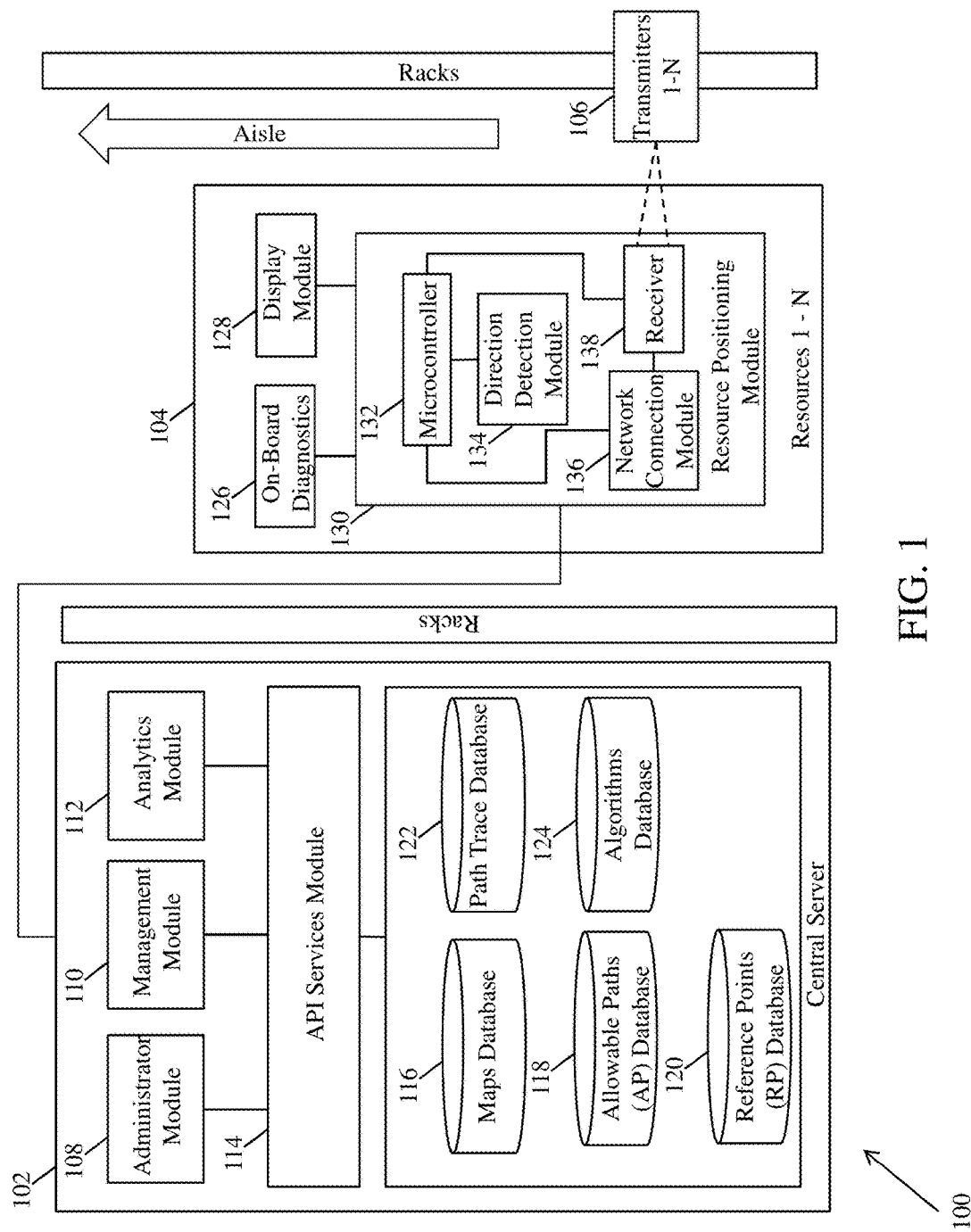
FIG. 1 is a block diagram illustrating a system for determining location of one or more resources in a predefined region, in accordance with an embodiment of the present invention.

FIG. 1 is a block diagram illustrating a system 100 for determining location of one or more resources in a predefined region, in accordance with an embodiment of the present invention. The system 100 comprises a central server 102, one or more resources 104 and one or more transmitters 106. In an embodiment of the present invention, the central server 102 resides in a cloud computing environment. In another embodiment of the present invention, the central server 102 resides within the predefined region. Further, the central server 102 communicates with the one or more resources 104 within the predefined region via any suitable network. In an embodiment of the present invention, the central server 102 communicates with the one or more resources via a Wireless Local Area Network (WLAN). The one or more transmitters 106 are installed on predetermined locations such as, but not limited to, one or more racks in one or more aisles of the predefined region. In an exemplary embodiment of the present invention, the one or more transmitters 106 are placed in the beginning and end of each of the one or more aisles.

In an embodiment of the present invention, the one or more resources include, but not limited to, tracking device, equipment, goods and wheeled carriages such as, but not limited to, the one or more forklifts, cars, wheelchairs, trolleys and carts. Further, the predefined region include, but is not limited to, a warehouse, a hospital, a factory, an enterprise or an organization, any an educational institution, a parking lot, an airport, a railway station and a bus station. In an embodiment of the present invention, the one or more resources are one or more forklifts in a warehouse. In another embodiment of the present invention, the one or more resources are one or more cars in a parking lot. In yet another embodiment of the present invention, the one or more resources are one or more medical equipment in a hospital. In yet another embodiment of the present invention, the one or more resources are one or more shopping carts in a supermarket.

In an embodiment of the present invention, the central server 102 comprises an administrator module 108, a management module 110, an analytics module 112, an Application Program Interface (API) services module 114, a maps database 116, an Allowable Paths DataBase (APDB) 118, a Reference Points DataBase (RPDB) 120, a path trace database 122 and an algorithms database 124. The administrator module 108 provides an interface to one or more administrators and/or one or more users to upload one or more maps of the predefined region. The one or more administrators are responsible for deploying and configuring the system 100. In an embodiment of the present invention, the one or more users include, but not limited to, managers of the predefined region such as warehouse managers and users of the one or more resources such as forklift drivers. In an embodiment of the present invention, the one or more managers are also the one or more administrators. The one or more maps of the predefined region are the layout/floor plan of the predefined region. In an embodiment of the present invention, the one or more maps of the predefined region are uploaded and stored in the maps database 116. In an embodiment of the present invention, the one or more maps of the predefined region are generated by extracting information related to geometrical entities such as, but not limited to, racks, aisles, blocked areas and free areas from engineering/construction drawings of the predefined region. In an embodiment of the present invention, the information from the engineering/construction drawings is extracted using Computer Aided Design (CAD) tools such as, but not limited to, AutoCAD. Further, the drawings in the CAD format are processed using a set of pre-stored workflows and converted into the layout/floor plan. In an embodiment of the present invention, the one or more maps are generated using files having format such as, but not limited to, vector format and electronic CAD format. The one or more maps are stored in the maps database 116 via the API services module 114.

Typically, a predefined region such as the warehouse has around 90% space for racks used for storage and 10% for aisles used for transportation of goods by the one or more resources 104 such as forklifts. The one or more resources 104 are also permitted to move in other designated driveways in the warehouse. After uploading the one or more maps, the one or more users, via the administrator module 108, define regions known as Allowable Paths (AP) in which the one or more resources 104 are permitted to move. Further, the allowable paths comprise, but not limited to, the one or more aisles and other designated driveways within the predefined region. Information related to the allowable paths such as, but not limited to, location coordinates and dimensions of the allowable paths are extracted from the one or more maps. Further, the direction in which the one or more resources 104 move in the allowable paths are recorded using a direction detection instrument such as a compass. In an embodiment of the present invention, the information related to the allowable paths is stored prior to deployment. Further, the information related to the allowable paths is stored in the APDB 118 via the API services module 114.

The administrator module 108 provides one or more options to the one or more administrators to create one or more reference point IDs corresponding to one or more reference points. The one or more reference points are a set of pre-defined points in the predefined region installed with the transmitter 106 that facilitates in identifying location of the one or more resources 104 when the one or more resources cross these points. Further, the one or more administrators map location coordinates corresponding to each of the one or more reference points on the map to the created one or more reference point IDs. The information related to the one or more reference points is stored in the RPDB 120. In an embodiment of the present invention, the mapping between the reference point IDs and corresponding location coordinates is stored in the RPDB 120 during deployment of the system 100 in the predefined region.

The management module 110 is configured to provide one or more options to the one or more managers of the predefined region for managing the operations of the predefined region and tracking the one or more resources. The one or more options provided by the management module 110 include, but are not limited to, tracking locations of the one or more resources 104, communicating with the one or more users of the one or more resources such as the forklift drivers, monitoring the floor and environment of the predefined region, monitoring situations such as, but not limited to, populated and congested areas, blockages, oil spills and dropped boxes, identifying crowded areas and monitoring emergency routing.

The analytics module 112 is configured to analyze information received from the one or more resources during operation and provide real-time insights to the one or more managers. The analytics module 112 is discussed in detail in later sections of the specification.

The one or more resources 104 are tracking devices, equipment, goods and wheeled carriages such as, but not limited to, the one or more forklifts, cars, wheelchairs, trolleys and carts. In an exemplary embodiment of the present invention, the one or more resources 104 such as the forklifts are used for lifting and moving goods over short distances in the warehouse. The one or more resources 104 comprise an On-Board Diagnostics (OBD) device 126, a display module 128 and a resource positioning module 130.

The OBD device 126 is a diagnostic tool fitted on the one or more resources 104. The OBD device 126 provides information such as, but not limited to, distance travelled by the one or more resources 104 after a predefined time interval to the resource positioning module 130. In an embodiment of the present invention, the OBD device 126 is installed on the one or more resources 104 such as the one or more forklifts by the manufacturer. In another embodiment of the present invention, the OBD device 126 is an external measurement tool that can be fitted by third party vendors on the one or more resources 104.

The display module 128 facilitates communication of the user of the one or more resources 104 with the one or more managers at the central server 102 as well as with the other users of the one or more resources. The display module 128 also facilitates the users of the one or more resources to check optimum routes and access the map of the predefined region.

The resource positioning module 130 comprises a microcontroller 132, a direction detection module 134, a network connection module 136 and a receiver 138. In an embodiment of the present invention, the resource positioning module 130 is an apparatus installed on the one or more resources 104 comprising a display module. In yet another embodiment of the present invention, the resource positioning module 130 is installed as an application on mobile devices of the one or more users of the one or more resources 104.

The microcontroller 132 comprises one or more algorithms for determining the location of the one or more resources 104 in real-time. The microcontroller 132 collects information from the central server 102, the OBD 126, the direction detection module 134 and the receiver 138 and determines the location of the resource 104 by executing the one or more algorithms using the collected information. In an embodiment of the present invention, the microcontroller 132 resides within the display module 128. In another embodiment of the present invention, the microcontroller 132 is installed as an application on the mobile device of the user of the one or more resources 104. In yet another embodiment of the present invention, the microcontroller 132 is an apparatus installed on the one or more resources 104.

The direction detection module 134 is configured to determine direction in which the one or more resources 104 move within the predefined region. The direction detection module 134 includes, but not limited to, a compass and a gyroscope. In an embodiment of the present invention, the direction detection module 134 receives information related to the motion of the resource 104 (such as a forklift) to determine whether the resource is moving forward or reverse using a sensor fitted on gear box of the resource. The microcontroller 132 retrieves information related to the direction in which the one or more resources 104 are moving from the direction detection module 134.

The network connection module 136 is configured to facilitate communication with the central server 102. The network communication module 136 facilitates communication with the central server 102 to retrieve map of the predefined region and location coordinates corresponding to the one or more reference points crossed by the one or more resources 104. The network connection module 136 is further configured to communicate information related to the location of the one or more resources 104 to the central server 102. The central server 102 stores the information related to the location of the one or more resources 104 in the path trace database 122.

The receiver 138 is configured to receive signals from the one or more transmitters 106 placed on the predetermined locations in the predefined region, when the one or more resources 104 are in vicinity of the one or more transmitters 106. In an embodiment of the present invention, the system 100 uses an optical transceiver for marking the one or more reference points in the warehouse. In another embodiment of the present invention, the one or more reference points on the aisles are marked using the compass and orientation of the aisles.

In an embodiment of the present invention, the one or more transmitters 106 on the aisle and the one or more receivers 138 on the one or more resources 104 communicate via a Visible Light Communication (VLC) system. The reference point ID is encoded into light pulses and transmitted by the transmitter 106. The receiver 138 on the resource 104 receives the light pulses and decodes the received light pulses into the corresponding reference point ID. In an embodiment of the present invention, the wavelength of the light pulses is within the visible light spectrum or the infra-red spectrum.

In operation, on receiving the signals from the one or more transmitters 106, the receiver 138 determines the reference point ID corresponding to the transmitter 106 from which the signals are received. The receiver 138 then forwards the determined reference point ID to the microcontroller 132. Further, the microcontroller 132 communicates with the central server 102 via the network connection module 136 to retrieve the location coordinates corresponding to the received reference ID from the RPDB 120. The microcontroller 132 saves the instance at which a particular resource 104 crossed the corresponding referenced point. As the one or more resources 104 move forward in the aisle, the microcontroller 132 fetches values of the distance traveled by the one or more resources 104, from the OBD device 126, after a pre-defined interval of time (hereinafter also referred to as DeltaT seconds). The microcontroller 132 also determines the direction of the one or more resources 104 from the direction detection module 134 to determine and send the exact location coordinates of the one or more resources 104 to the central server 102 after every DeltaT seconds. In an embodiment of the present invention, the microcontroller 132 determines the location coordinates of the one or more resources 104 after one second (wherein DeltaT is equal to one second). The microcontroller 132 continuously determines location coordinates after the pre-determined interval of time until the receiver 138 on the one or more resources 104 receives a new signal from another transmitter 106 and the above-mentioned steps are repeated thereon. The system for determining location of the one or more resources 104 described above is also referred to as a "marker-distance algorithm" hereinafter.

In an embodiment of the present invention, the system 100 also facilitates in determining the location of the one or more resources 104, when the one or more resources 104 are moving in an unconstrained manner in free spaces that may or may not have well-defined paths. Further, the system 100 uses a Recursive Descent by Signal Strength (RDSS) algorithm stored in the algorithms database 124. One or more beacons are installed on pre-determined locations on the floor of the predefined region. Further, the one or more beacons emit radio-frequency signals. The strength of the one or more signals at different points on the floor of the warehouse (also referred to as grid points) are pre-stored in the central server 102. In an embodiment of the present invention, the signal strengths received at each of the one or more grid points, from the one or more beacons, are pre-stored as a Recursive Descent Signal Strength (RDSS) tree in a descending order during RDSS tree creation. The RDSS tree of each floor has a root which contains floor ID of the predefined region. Further, the nodes of the tree contains beacon IDs. The first level nodes comprise beacon IDs of all the nodes installed on the floor of the predefined region. The second level nodes (intermediate nodes) contain the beacon ID of the beacons that have second strongest signal with respect to the first level nodes. The third level nodes contain the beacon ID of the beacons that have the third strongest signal within the second level nodes. The above-mentioned process is repeated till the number of level reaches a pre-determined number called depth of the tree (hereinafter also referred to as RDSS-D). At the end of the RDSS tree are one or more leaf nodes. The one or more grid points that match the recursive descent are attached to the corresponding leaf node of the RDSS tree along with their coordinates with respect to the predefined region as a leaf group. The created RDSS tree is stored in an RDSS tree database (not shown) in the central server 102.

Figure 1A:
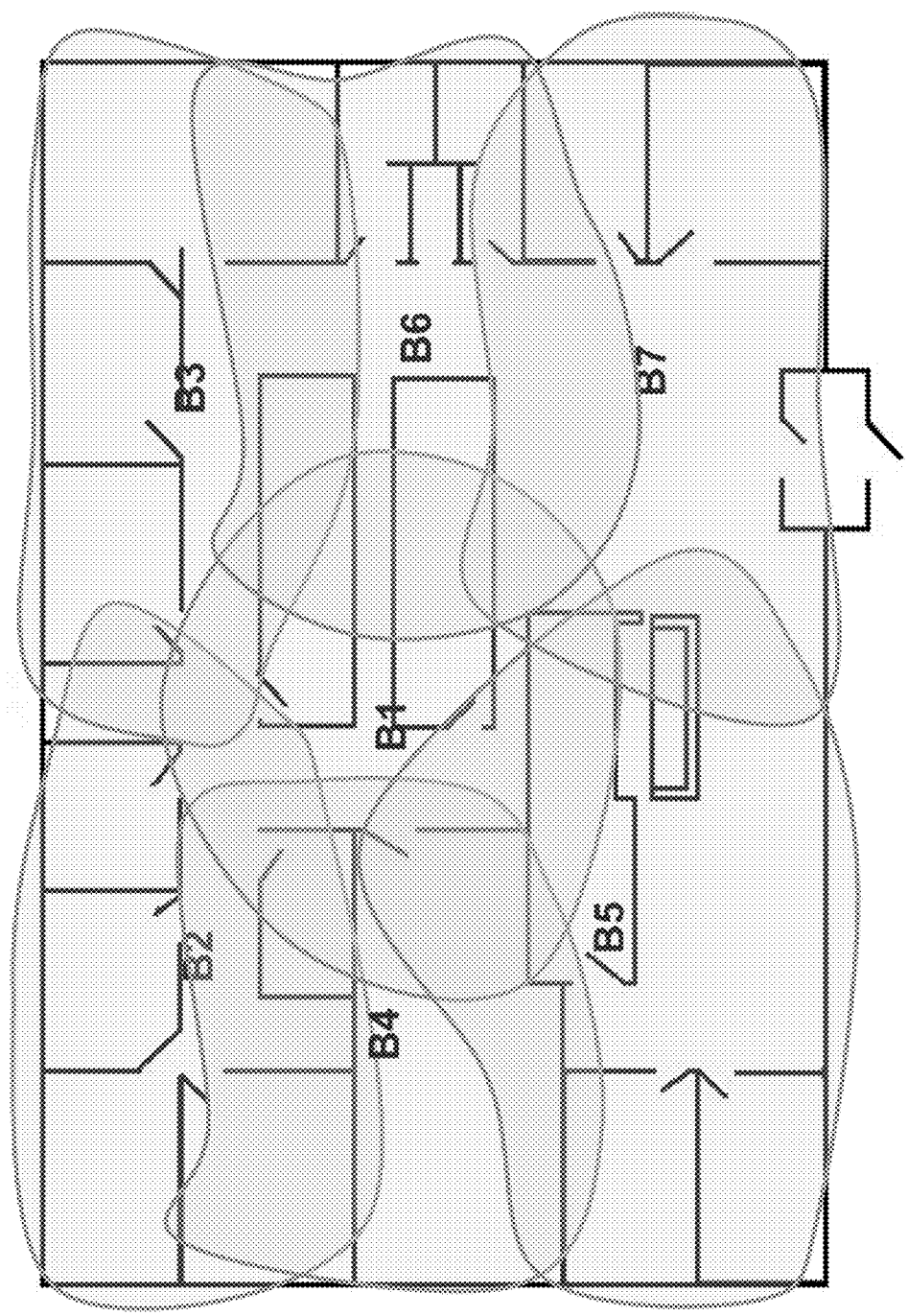
FIG. 1A illustrates floor of a predefined region having beacons installed at various locations, in accordance with an exemplary embodiment of the present invention.
Figure 1B:
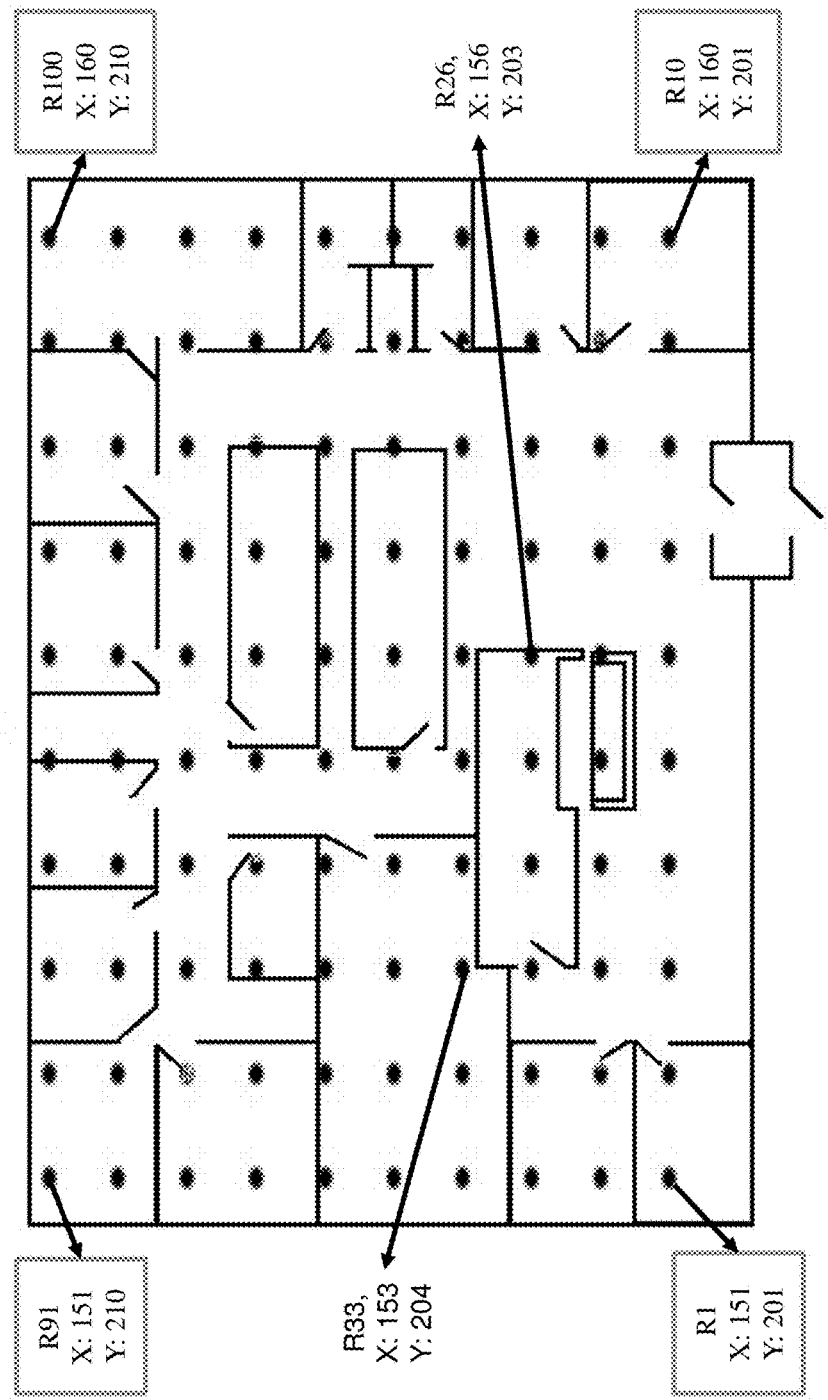
FIG. 1B illustrates grid points (R1 to R100) on the floor of the predefined region, in accordance with an exemplary embodiment of the present invention.
Figure 1D:
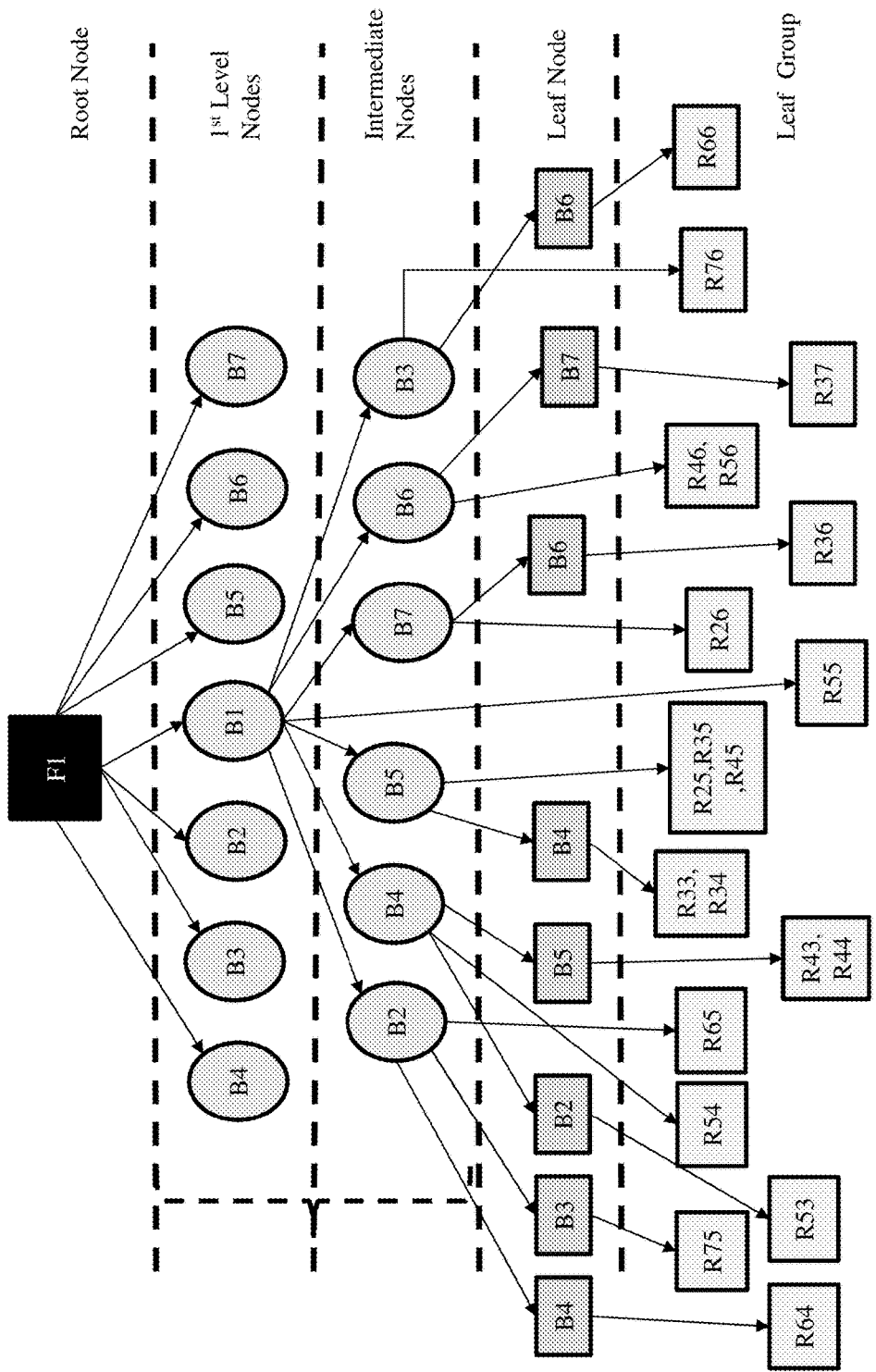
FIG. 1D illustrates part of an RDSS tree, in accordance with an exemplary embodiment of the present invention.

FIG. 1A illustrates floor of a predefined region having beacons installed at various locations, in accordance with an exemplary embodiment of the present invention. Further, B1 to B7 are beacon IDs of the beacons installed on the floor of the predefined region with overlapping fields. FIG. 1B illustrates grid points (R1 to R100) on the floor of the predefined region, in accordance with an exemplary embodiment of the present invention. Further, the signal strength from the beacons B1 to B7, referred to as Received Signal Strength Indicator (RSSI) values, at the grid points are recorded and stored in the RDSS tree. FIG. 1C is a table illustrating RSSI values at select grid points in vicinity of beacon B1, in accordance with an exemplary embodiment of the present invention. Further, the RSSI values at the grid points in vicinity of the beacon B1 are sorted in a descending order prior to storing in the RDSS tree. The RDSS tree corresponding to the illustrated table is depicted in FIG. 1D. FIG. 1D illustrates part of an RDSS tree, in accordance with an exemplary embodiment of the present invention. The illustrated RDSS tree is detailed only with respect to beacon B1 for understanding and clarity.

In an embodiment of the present invention, during operation, when the resource 104 moves on the floor of the predefined region, a beacon reader (not shown) on the resource 104 receives signals from the one or more beacons. The received signals comprise a name and value pair corresponding to each of the one or more beacons. Further, the name and value pair comprises a name or beacon ID of the beacon emitting signal and value of the signal strength measured as Received Signal Strength Indicator (RSSI), from the corresponding beacon. Furthermore, the received signals from the one or more beacons are sorted in the form of a Current Mobile Signal Vector (CMSV) and forwarded to the microcontroller 132. In an embodiment of the present invention, the signals from the one or more beacons are received and sorted by the beacon reader (not shown) available with the user of the resource 104. In another embodiment of the present invention, the signals from the one or more beacons are received by the mobile device and sorted by a mobile application installed on the mobile device of the user of the resource 104. The CMSV and the RDSS tree are used by the microcontroller 132 to run the recursive descent by signal strength algorithm to determine the location of the resource 104 in the predefined region. In an embodiment of the present invention, the algorithm is executed by the microcontroller 132 by using the RDSS tree from the RDSS tree database (not shown) residing on the central server 102 and the CMSV from the beacon reader (not shown) for determining the location of the resource 104. In another embodiment of the present invention, the algorithm is executed at the central server 102, by forwarding the CMSV from the resource 104, via the network connection module 136 for determining position of the resource 104.

On execution, the RDSS algorithm uses one or more beacon IDs having highest signal values from the CMSV and finds the same in the first level nodes (referred to as Node As) of the RDSS tree of the floor of the predefined region. The RDSS algorithm then uses the one or more beacon IDs having second highest values from the CMSV and finds the same in the second level nodes of the RDSS tree under the Node A (referred to as Node B). Further, RDSS algorithm then uses the one or more beacon IDs having the third highest values of signal from the CMSV and finds the corresponding one or more beacon IDs under the Node B. The RDSS algorithm repeats this recursion, RDSS-D times, till a leaf node for the corresponding CMSV is reached. The leaf node contains a set of grid points known as the leaf group. A K-Nearest Neighbors (K-NN) algorithm is then used on the set of grid points of the leaf node to determine a grid point which has lowest Euclidean distance from the CMSV. The coordinates of the determined grid point is the location of the resource 104. The system for determining location of the one or more resources 104 using the RDSS algorithm described above may be referred to as "RDSS algorithm" hereinafter.

In an embodiment of the present invention, the one or more managers may employ both the RDSS algorithm and the marker-distance algorithm for determining location of the one or more resources 104. In another embodiment, the marker-distance algorithm is primarily used for tracking the one or more resources 104 and the RDSS algorithm is used as a backup and vice-versa. In yet another embodiment, the warehouse may employ either the RDSS algorithm or the marker-distance algorithm for determining location of the one or more resources 104 in the predefined region.

In an embodiment of the present invention, the marker-distance algorithm is employed using one or more modules of the system 100. In another embodiment of the present invention, the RDSS algorithm is employed using one or more modules of the system 100, the beacon reader (not shown) and the RDSS tree database (not shown) that are required for implementing the RDSS algorithm. In yet another embodiment of the present invention, the system 100 also comprise the beacon reader (not shown) on the one or more resources 104 and the RDSS tree database (not shown) to implement both the RDSS algorithm and the distance-marker algorithm using the system 100.

On determining the location coordinates of the one or more resources 104, the central server 102 generates heat maps to determine crowded areas in the predefined region. In an embodiment of the present invention, the analytics module 112 residing in the central server 102 collects and analyzes the information received from the one or more resources 104 and from other components of the system 100 to generate the heat maps. The information received by the analytics module 112 includes, but not limited to, path travelled by the one or more resources 104, ID of the one or more resources 104, details of the users of the one or more resources 104, nature of objects carried, weight carried and time taken for various trips by the one or more resources 104. The analytics module 112 then provides recommendations to the one or more managers to relocate goods based on the generated heat maps.

The analytics module 112 also provides one or more options to the one or more managers for tracking location of the one or more resources 104 in real-time, communicating with the users of the one or more resources 104, monitoring the routes taken by the one or more resources 104, navigating the one or more resources 104 for optimum routing and during emergency routing, analyzing routes taken by the one or more resources 104, generating heat maps to determine crowded areas within the predefined regions and notifying the users of the one or more resources 104 in case of obstructions/blockages in the allowable paths due to incidents such as, but not limited to, oil spills, spilled goods and repairs. In an embodiment of the present invention, the analytics module 112 communicates with the algorithms database 124 to fetch and execute one or more pre-stored algorithms for determining optimum routes for the one or more resources 104. In an embodiment of the present invention, the optimum routes determined by the analytics module 112 uses one or more of the allowable paths stored in APDB 118.

In an embodiment of the present invention, the analytics module 112 facilitates in identifying crowded areas within the predefined regions and providing traffic patterns based on preferences such as, but not limited to, time of the day and day of the week. Further, the analytics module 112 facilitates in identifying bottlenecks and accident prone zones in the predefined regions. In an embodiment of the present invention, the analytics module 112 is a web-based tool accessible via the central server 102.

In an embodiment of the present invention, the display module 128 on the one or more resources 104 facilitate communication of the users of the one or more resources 104 with the one or more managers and other users via the central server 102, displaying map of the predefined region and viewing current route and position of the resource. In another embodiment of the present invention, the mobile device of the users of the one or more resources 104 acts as the display module 128 and facilitates communication with the microcontroller 132 on the resource 104 via a mobile application installed on the mobile device. The users of the one or more resources provide the starting and destination points within the predefined region using the map. The display module 128 then communicates with the algorithms module 124 to determine optimum routes for the one or more resources 104. In an embodiment of the present invention, the display module 128 communicates with the central server 102 and provides optimum routing by providing shortest possible route from destination to target with respect to the location of the other resources. In an embodiment of the present invention, the display module 128 communicates with the central server 102 continuously and guides the users of the one or more resources with the shortest route in case the users take a wrong turn or encounter cluttered aisles. In an embodiment of the present invention, users of the one or more resources and the one or more managers update the map of the predefined region with respect to obstructions/blockages in the predefined region to facilitate the display module 128 in providing optimum routes based on the obstructions/blockages.

In an embodiment of the present invention, the central server 102 comprises a proximity module (not shown) configured to notify the user of the resource 104 in case the resource 104 is close to another resource 104. In an embodiment of the present invention, the proximity module (not shown) is connected with the braking system of the resource 104 such as the forklift or shopping cart to automatically apply brakes in case the proximity module (not shown) determines that the forklift or shopping cart is too close to another forklift or shopping cart.

In an embodiment of the present invention, one or more sensors may be installed on various spots in the predefined region to track movement of people and the one or more resources 104 within the predefined region. Further, the one or more sensors are linked with the microcontroller 132 on the one or more resources for notifying and updating the users of the one or more resources 104 and for determining location of the one or more resources 104. In an embodiment of the present invention, the mobile devices of the people in the predefined region are also linked with the one or more sensors for sending notifications and updates from the one or more sensors. In an embodiment of the present invention, the one or more sensors include, but not limited to, radio frequency identification, Bluetooth, Wi-Fi and photo recognition. In an embodiment of the present invention, the predefined region is installed with one or more proximity sensors at various locations. Further, the one or more proximity sensors are configured to locate the region in which the one or more resources 104 are operating. Furthermore, the one or more proximity sensors are used to initialize operations when the one or more resources 104 have not crossed any reference point. In an exemplary embodiment of the present invention, the one or more proximity sensors are configured to detect the presence of the one or more resources 104 within 30 meters.

In an embodiment of the present invention, the system 100 is deployed in any environment, such as, but not limited to, a factory, a manufacturing plant, an assembling plant, a warehouse, a hospital, a factory, an enterprise or an organization, any an educational institution, a parking lot, an airport, a railway station and a bus station.

Figure 2:
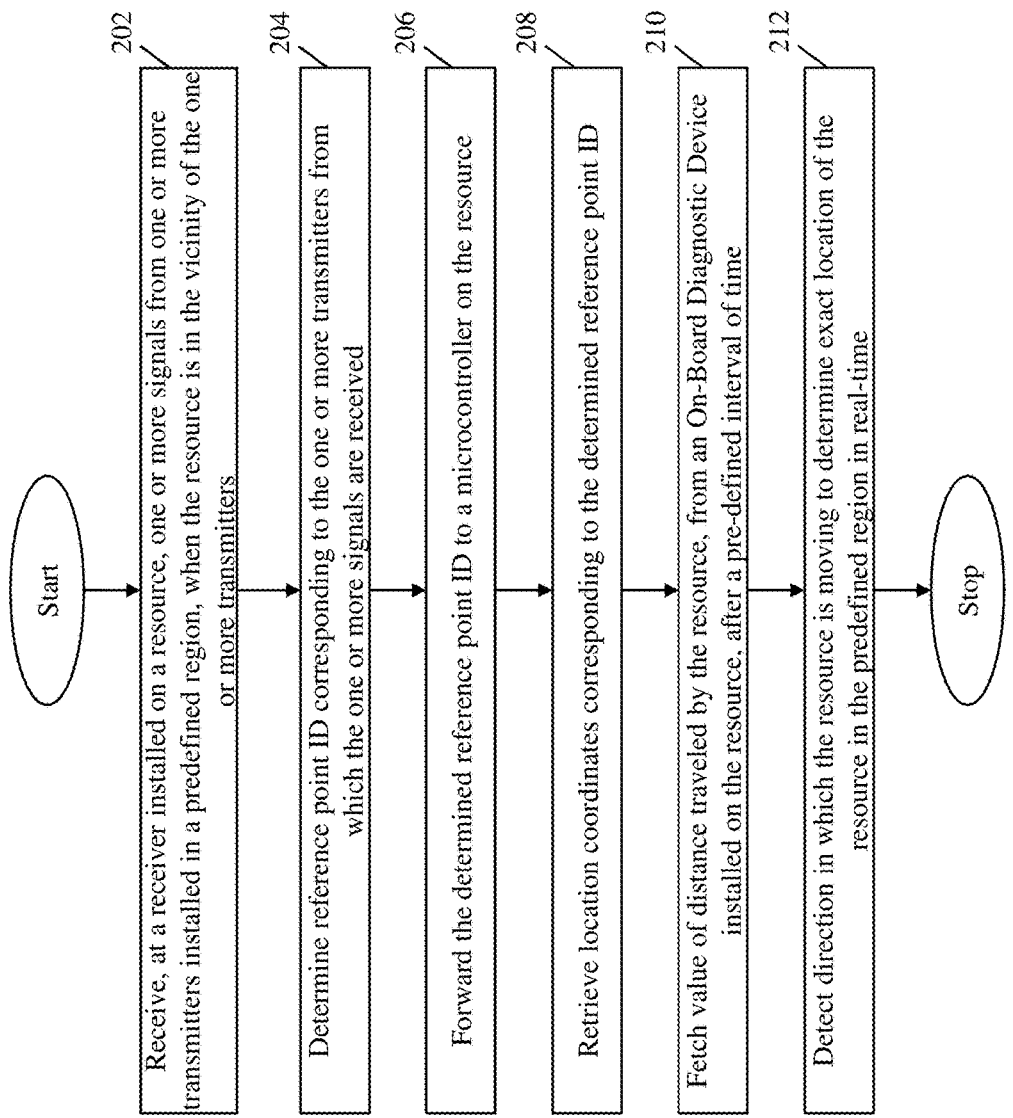
FIG. 2 is a flowchart illustrating a method for determining location of one or more resources in a predefined region, in accordance with an embodiment of the present invention.

FIG. 2 is a flowchart illustrating a method for determining location of one or more resources in a predefined region, in accordance with an embodiment of the present invention. The method illustrated in FIG. 2 is referred to as marker distance algorithm.

At step 202, one or more signals are received, at a receiver installed on a resource, from one or more transmitters placed on predetermined locations such as, but not limited to, one or more racks/stands in a predefined region. In an embodiment of the present invention, the one or more signals are received when one or more resources are in vicinity of the one or more transmitters. The one or more resources comprise tracking devices, equipment, goods and wheeled carriages, wherein the wheeled carriages comprise forklifts, cars, wheelchairs, trolleys and carts. The predefined region includes, but not limited to, a warehouse, a hospital, a factory, an enterprise or an organization, any an educational institution, a parking lot, an airport, a railway station and a bus station. In an exemplary embodiment of the present invention, the one or more signals are received when one or more forklifts pass through one or more aisles in which the one or more racks are placed with the one or more transmitters.

At step 204, reference point ID corresponding to the one or more transmitters, from which the one or more signals are received, is determined. Further, one or more reference points are a set of pre-defined points in the predefined region installed with a transmitter that facilitates in identifying location of one or more resources when the one or more resources cross these points.

Prior to deployment, one or more administrators or one or more managers of the predefined region map location coordinates corresponding to each of the one or more reference points on the map to the one or more reference point IDs. The map of the predefined region is the layout/floor plan generated by extracting information related to geometrical entities such as, but not limited to, racks, aisles, blocked areas and free areas from engineering/construction drawings of the predefined region. In an embodiment of the present invention, the information from the engineering/construction drawings are retrieved using Computer Aided Design (CAD) tools such as, but not limited to, AutoCAD. In another embodiment of the present invention, the map is uploaded by the one or more administrators. In an embodiment of the present invention, the mapping of the reference point IDs, their corresponding location coordinates and the map of the predefined region are stored in a central server that communicates with the one or more resources via a network. In an embodiment of the present invention, the one or more administrators, via the central server, also define regions known as Allowable Paths (AP) in which the one or more resources are permitted to move. The allowable paths comprise, but not limited to, the one or more aisles and other designated driveways within the predefined region. Information related to the allowable paths such as, but not limited to, location coordinates and dimensions of the allowable paths are extracted from the map of the predefined region. The direction in which the one or more resources are permitted to move in the allowable paths are also configured by the one or more managers using a direction detection instrument such as, but not limited to, a compass.

The one or more transmitters on the racks/stands and the one or more receivers on the one or more resources communicate via a Visible Light Communication (VLC) system when the one or more resources move into the aisles. Further, the reference point ID corresponding to each of the one or more transmitters is encoded into light pulses. Furthermore, the light pulses are emitted by the transmitter. The receiver on the resource receives the light pulses and decodes the received light pulses into the corresponding reference point ID. In an embodiment of the present invention, the wavelength of the light pulses is within the visible spectrum or the infra-red spectrum.

At step 206, the determined reference point ID is forwarded, by the receiver, to a microcontroller installed on the resource.

At step 208, location coordinates corresponding to the determined reference point ID are retrieved by the microcontroller from the central server. In an embodiment of the present invention, the microcontroller communicates with the central server via a Wireless Local Area Network (WLAN).

At step 210, value of distance traveled by the resource is fetched from an On-Board Diagnostic Device installed on the resource. Further, the value of the distance traveled by the resource is fetched after a pre-defined interval of time (referred to as DeltaT). In an embodiment of the present invention, the one or more managers define the interval of time DeltaT prior to deployment. In an exemplary embodiment of the present invention, the pre-defined interval of time DeltaT after which the microcontroller communicates with the on-board diagnostic device is one second. In an embodiment of the present invention, the on-board diagnostic device is installed on the resource by the manufacturer. In another embodiment of the present invention, the on-board diagnostic device is an external device that may or may not be a part of the microcontroller.

At step 212, direction in which the resource is moving is detected to determine the next location of the resource after DeltaT seconds. In an embodiment of the present invention, the direction in which the resource is moving is determined using an orientation/direction detection instrument such as, but not limited to, a compass and a gyroscope. Once the microcontroller determines the location of the resource, the microcontroller transmits the location of the resource to the central server. In an embodiment of the present invention, one or more managers access the location of the one or more resources via the central server.

The central server provides one or more options to the one or more managers for, but not limited to, tracking location of the one or more resources, communicating with the one or more resources, monitoring the routes of the one or more resources, navigating the one or more resources for optimum routing and during emergency routing, analyzing routes taken by the one or more resources, generating heat maps to determine crowded areas within the predefined region and notifying the users of the one or more resources in case of obstructions/blockages in the allowable paths.

In an embodiment of the present invention, the one or more resources have a user interface to facilitate communication of the user of the resource with the one or more managers at the central server and with users of other resources.

In an embodiment of the present invention, the resource is installed with a proximity sensor configured to notify the user of a resource in case the resource is close to another resource. In an embodiment of the present invention, the microcontroller retrieves, from the central server, the map of the predefined region. The microcontroller then provides the retrieved map to the user of the resource via the user interface. Further, the user of the resource provides the starting and destination points within the predefined region using the map. The microcontroller then communicates with the central server to determine optimum routes for the resource. In an embodiment of the present invention, the microcontroller communicates with the central server and provides shortest possible route from destination to target based on location of the other resources.

Figure 3:
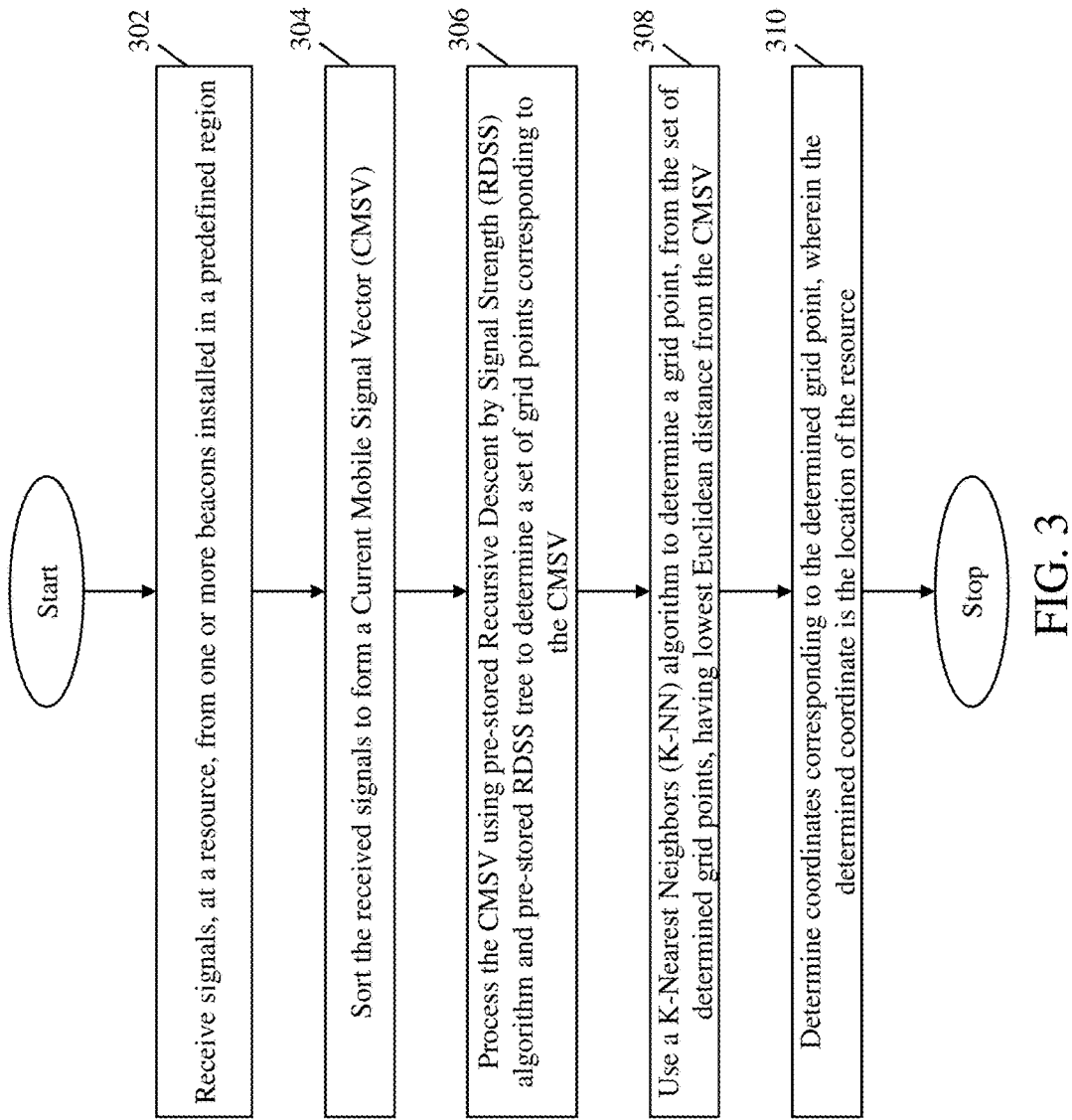
FIG. 3 is a flowchart illustrating a method for determining location of one or more resources in a predefined region, in accordance with another embodiment of the present invention.

FIG. 3 is a flowchart illustrating a method for determining location of one or more resources in a predefined region, in accordance with another embodiment of the present invention. The method illustrated in FIG. 3 is referred to as RDSS algorithm.

At step 302, signals from one or more beacons installed in a predefined region are received by a resource. Further, the received signals comprise a name and value pair corresponding to each of the one or more beacons. Further, the name and value pair comprises a name or beacon ID of the beacon emitting signal and value of the signal strength (referred as Received Signal Strength Indicator (RSSI)) from the corresponding beacon. In an embodiment of the present invention, the one or more resources include, but not limited to, tracking devices, equipment, goods and wheeled carriages, wherein the wheeled carriages comprise forklifts, cars, wheelchairs, trolleys and carts. Further, the predefined region includes, but not limited to, a warehouse, a hospital, a factory, an enterprise or an organization, any an educational institution, a parking lot, an airport, a railway station and a bus station.

In an embodiment of the present invention, the signals are received when the resource moves in free spaces, within the predefined region, that may or may not have well-defined paths. In an embodiment of the present invention, the one or more beacons are installed on pre-determined locations on the floor of the predefined region. Further, the one or more beacons emit radio-frequency signals. The RSSI received at different points on the floor of the warehouse (referred to as grid points) are pre-stored in a central server. In an embodiment of the present invention, the signal strengths from the one or more beacons at each of the one or more grid points are pre-stored in an RDSS Tree database, as a Recursive Descent Signal Strength (RDSS) tree in a descending order. The RDSS tree has a root which contains floor ID of the predefined region. The nodes of the tree contains beacon IDs. Further, the first level nodes comprise beacon IDs of all the beacons installed on the floor of the warehouse. The second level nodes (intermediate nodes) contain the beacon ID of the beacons that have second strongest signal with respect to the first level nodes. The third level nodes contain the beacon ID of the beacons that have the third strongest signal within the second level nodes. The number of levels of nodes is continued based on a pre-determined depth of the tree (referred to as RDSS-D). Further, at the end of the RDSS tree are one or more leaf nodes. Furthermore, the one or more grid points that match the recursive descent of the leaf are attached to the corresponding leaf node and referred to as a leaf group. Coordinates of the one or more grid points that match the recursive descent of the leaf are also attached to the leaf node. In an embodiment of the present invention, the RDSS tree is generated for each floor of the predefined region during the deployment stage and stored in a central server.

At step 304, the received signals from the one or more beacons are sorted to form a Current Mobile Signal Vector (CMSV). In an embodiment of the present invention, when the resource moves on the floor of the predefined region, a beacon reader on the resource receives and sorts signals from the one or more beacons. In another embodiment of the present invention, the signals from the one or more beacons are received by the mobile device and sorted by a mobile application installed on the mobile device.

At step 306, the CMSV is processed using pre-stored Recursive Descent by Signal Strength (RDSS) algorithm and pre-stored RDSS tree to determine a set of grid points corresponding to the CMSV.

On execution, the RDSS algorithm uses one or more beacon IDs having highest signal values from the CMSV and finds the same in the first level nodes of the RDSS tree of the floor of the predefined region (referred to as Node A). The RDSS algorithm then uses the one or more beacon IDs having second highest values from the CMSV and finds the same in the second level nodes of the RDSS tree under the Node A (referred to as Node B). Further, RDSS algorithm uses the one or more beacon IDs having the third highest values of signal from the CMSV and finds the corresponding one or more beacon IDs under the Node B. The RDSS algorithm repeats the recursion till a leaf node is reached. The leaf node contains a set of corresponding grid points, the leaf group. The leaf group is then processed at step 308.

At step 308, a K-Nearest Neighbors (K-NN) algorithm is used to determine a grid point, from the leaf group, which has lowest Euclidean distance from the CMSV.

At step 310, coordinates of the grid point having lowest Euclidean distance from the CMSV are determined. Further, the determined coordinates are the location of the resource in the predefined region. In an embodiment of the present invention, the coordinates of the determined grid point are stored in the central server.

In an embodiment of the present invention, the one or more managers may employ both RDSS algorithm and marker-distance algorithm for determining location of the one or more resources. In another embodiment, the marker-distance algorithm is primarily used for tracking resources and the RDSS algorithm is used as a backup. In yet another embodiment, the warehouse may employ either the RDSS algorithm or the marker-distance algorithm.

Figure 4:
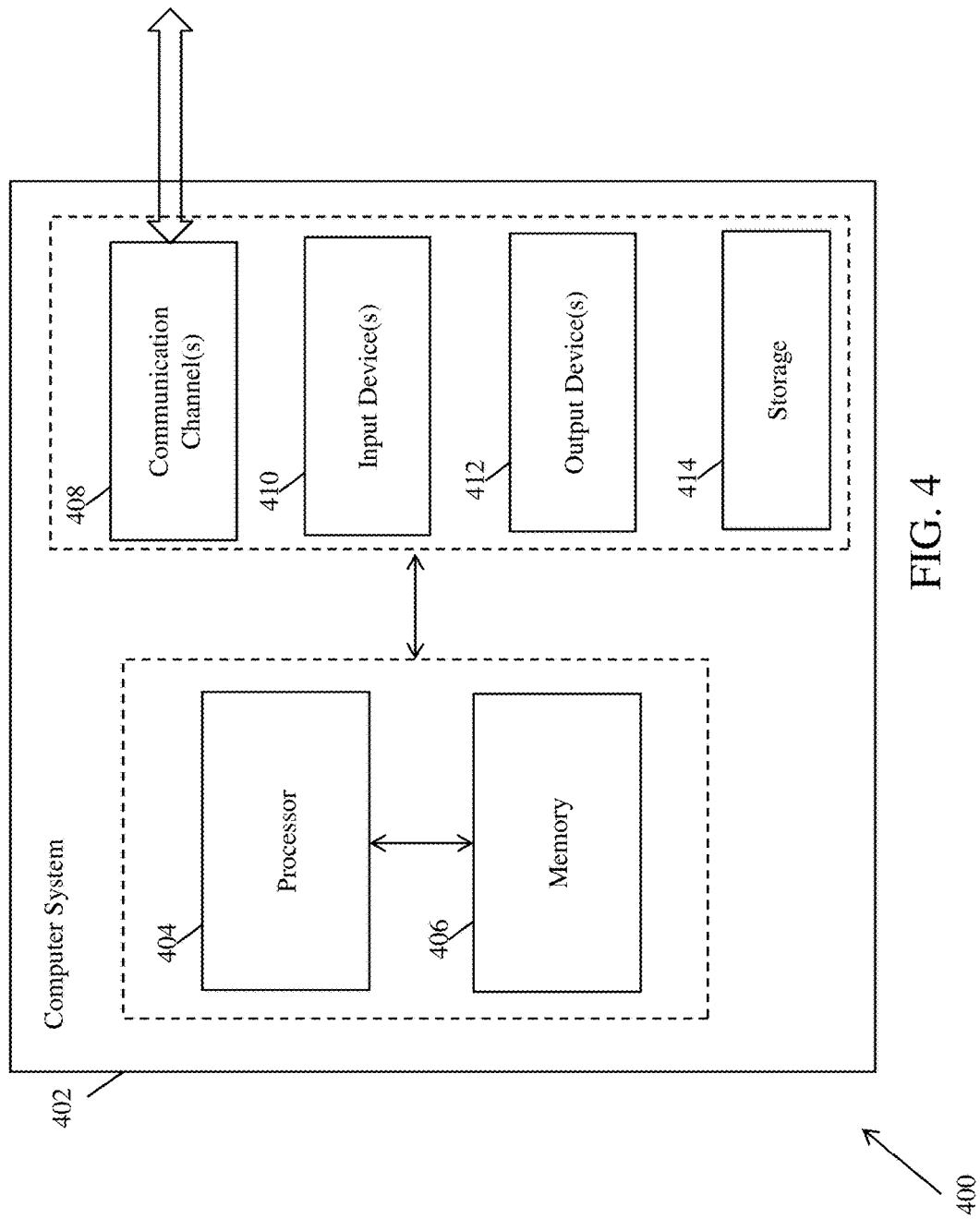
FIG. 4 illustrates an exemplary computer system for determining location of one or more resources in a predefined region, in accordance with an embodiment of the present invention.

FIG. 4 illustrates an exemplary computer system for determining location of one or more resources in a predefined region, in accordance with an embodiment of the present invention.

The computer system 402 comprises a processor 404 and a memory 406. The processor 404 executes program instructions and may be a real processor. The processor 404 may also be a virtual processor. The computer system 402 is not intended to suggest any limitation as to scope of use or functionality of described embodiments. For example, the computer system 402 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various softwares executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 410 may include, but not limited to, a keyboard, mouse, pen, joystick, trackball, a voice device, a scanning device, or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

I claim:

1. A system for determining location of one or more resources in a predefined region, the system comprising:
   a beacon reader, in a mobile device, configured to:
      receive signals from one or more beacons installed in a predefined regions; and
      sort the received signals to form a Current Mobile Signal Vector (CMSV);
   a microcontroller, in the mobile device, configured to:
      process the CMSV using a pre-stored Recursive Descent by Signal Strength (RDSS) algorithm and a pre-stored RDSS tree received from a central server via a network connection module to determine a set of grid points corresponding to the CMSV, wherein beacon IDs with signal strength values from the CMSV are used to identify the beacons of the predefined region, based on corresponding beacon IDs pre-stored in a descending order of node levels of the RDSS tree, recursively until a leaf node of the RDSS tree is reached which includes the set of grid points that correspond to the CMSV;
      use a K-Nearest Neighbors (K-NN) algorithm to determine a grid point from the set of determined grid points having lowest Euclidean distance from the CMSV;
      determine coordinates corresponding to the determined grid point, wherein the determined coordinate is the location of the resource; and
      transmit the location of the determined resource to the central server.

2. The system of claim 1, wherein the one or more resources comprise tracking devices, equipment, goods and wheeled carriages and further wherein the wheeled carriages comprise forklifts, cars, wheelchairs, trolleys and carts.

3. The system of claim 1, wherein the predefined region comprise a warehouse, a hospital, a factory, an enterprise or an organization, an educational institution, a parking lot, an airport, a railway station and a bus station.

4. The system of claim 1, wherein the system comprises a RDSS tree database in the central server for storing the RDSS tree which comprises beacon IDs of the beacons in the descending order of node levels based on signal strength of the beacons and the one or more grid points that match the descent are attached to corresponding leaf nodes of the RDSS tree along with their coordinates with respect to the predefined region; and an analytics module, in the central server, configured to provide optimum routing of the resource by providing shortest possible route with respect to other resources based on the determined location of the resource.

5. A computer-implemented method for determining location of one or more resources in a predefined region, via program instructions stored in a memory and executed by a processor, the computer-implemented method comprising:
   receiving one or more signals from one or more beacons installed in a predefined region;
   sorting the received one or more signals to form a Current Mobile Signal Vector (CMSV);
   processing the CMSV using a pre-stored Recursive Descent by Signal Strength (RDSS) algorithm and a pre-stored RDSS tree to determine a set of grid points corresponding to the CMSV, wherein beacon IDs with signal strength values from the CMSV are used to identify the beacons of the predefined region, based on corresponding beacon IDs pre-stored in a descending order of node levels of the RDSS tree, recursively until a leaf node of the RDSS tree is reached which includes the set of grid points that correspond to the CMSV;
   using a K-Nearest Neighbors (K-NN) algorithm to determine a grid point, from the set of determined grid points having lowest Euclidean distance from the CMSV;
   determining coordinates corresponding to the determined grid point, wherein the determined coordinate is the location of the resource; and
   transmitting the location of the determined resource to a central server.

6. The computer-implemented method of claim 5, wherein the one or more resources comprise tracking devices, equipment, goods and wheeled carriages and further wherein the wheeled carriages comprise forklifts, cars, wheelchairs, trolleys and carts.

7. The computer-implemented method of claim 5, wherein the predefined region comprise a warehouse, a hospital, a factory, an enterprise or an organization, an educational institution, a parking lot, an airport, a railway station and a bus station.

8. The computer-implemented method of claim 5, wherein the pre-stored RDSS tree comprises beacon IDs of the beacons in the descending order of node levels based on signal strength of the beacons and the one or more grid points that match the descent are attached to corresponding leaf nodes of the RDSS tree along with their coordinates with respect to the predefined region.

9. A computer program product for determining location of one or more resources in a predefined region, the computer program product comprising:

a non-transitory computer-readable medium having computer-readable program code stored thereon, the computer-readable program code comprising instructions that when executed by a processor, cause the processor to:

receive one or more signals from one or more beacons installed in a predefined region;

sort the received one or more signals to form a Current Mobile Signal Vector (CMSV);

process the CMSV using a pre-stored Recursive Descent by Signal Strength (RDSS) algorithm and a pre-stored RDSS tree to determine a set of grid points corresponding to the CMSV, wherein beacon IDs with signal strength values from the CMSV are used to identify the beacons of the predefined region, based on corresponding beacon IDs pre-stored in a descending order of node levels of the RDSS tree, recursively until a leaf node of the RDSS tree is reached which includes the set of grid points that correspond to the CMSV;

use a K-Nearest Neighbors (K-NN) algorithm to determine a grid point, from the set of determined grid points having lowest Euclidean distance from the CMSV;

determine coordinates corresponding to the determined grid point, wherein the determined coordinate is the location of the resource; and transmit the location of the determined resource to a central server.

* * * * *